3,432,572
CODIMERIZATION PROCESS
James J. Tazuma, Stow, and Mario D. Zadra, Barberton, Ohio, assignors to The Goodyear Tire & Rubber Company, Akron, Ohio, a corporation of Delaware
No Drawing. Continuation-in-part of application Ser. No. 347,673, Feb. 27, 1964. This application Sept. 1, 1966, Ser. No. 576,565
The portion of the term of the patent subsequent to Feb. 21, 1984, has been disclaimed
U.S. Cl. 260—683.15   8 Claims
Int. Cl. C07c 3/20, 11/02

ABSTRACT OF THE DISCLOSURE

There is disclosed a process wherein ethylene is codimerized with a dissimilar olefin by use of a catalyst system which is an alkali metal supported on pellets composed of at least 85% magnesia and having a pellet density of between 0.25 and 0.75 gram per cubic centimeter and which have been heat treated between 500° and 1000° C. prior to having the alkali metal deposited on them.

---

This application is a continuation-in-part of application SN 347,673, filed Feb. 27, 1964, now abandoned, which in turn, was a continuation-in-part of application SN 311,213, filed Sept. 23, 1963 now abandoned.

This invention relates to codimerization of ethylene with certain other olefins, employing as a catalyst, certain alkali metals supported on magnesia and/or magnesia containing certain additives.

The terms "codimerization," "codimer," "codimerized," "mix-dimerization," "mix-dimer" and "mix-dimerized," as employed in this application is meant to denote that one molecule of ethylene is joined with one molecule of another olefin (a term described in more detail later in this specification). This codimerization or mix-dimerization can be conducted either as a separate codimerization reaction or several consecutive codimerizations can be conducted in the same reaction. For instance one mol of ethylene can be reacted with one mol of propylene to form 2-pentene and the 2-pentene removed and reacted with an additional mol of ethylene to form 2-ethyl-2-pentene. On the other hand one mol of ethylene can be reacted with one mol of propylene to form 2-pentene which is subsequently reacted with an additional mol of ethylene in the same reaction to form 2-ethyl-2-pentene by employing as a feed stock two mols of ethylene per mol of propylene.

It is known that ethylene may be codimerized with other olefins by means of alkali metal such as sodium supported on carbon. For instance, when propylene and ethylene are codimerized at about 70° C. over a catalyst comprising sodium supported on charcoal, 2-pentene is produced. If the temperature of the same polymerization is raised to about 150° C. the principal products are 2-pentene and 3-ethyl-2-pentene. Similarly, the codimerization of 2-pentene and ethylene yields 3-ethyl-2-pentene. Further, it is known that if mixed alkali metals such as potassium and lithium are employed without a support to codimerize propylene and ethylene, pentene-1 is produced. If butene and ethylene are codimerized with potassium and lithium, 3-methyl-1-pentene is produced and if pentene and ethylene are codimerized with potassium and lithium, 3-ethyl-1-pentene is produced. However, the selectivity to the specific product desired of these codimerization experiments are relatively low, i.e. ranging from about 48% to about 58%.

Therefore, it is the object of this invention to provide a process whereby ethylene may be codimerized with other olefins such as propylene, butenes, pentenes and higher olefins to form olefins such as pentene, 3-methyl-1-pentene, 3-ethyl-1-pentene and higher olefins in higher selectivity than heretofore known. Other objects will become apparent as the description proceeds.

Accordingly, this invention is a process comprising codimerizing ethylene with other olefins by means of a catalyst containing approximately 10% to 50% by weight of an alkali metal selected from the group consisting of potassium, cesium and rubidium supported on magnesia pellets.

In the practice of this invention it is generally desirable to employ a continuous process. However, a batch process may also be successfully employed.

The temperature and the rate at which the codimerizations of this invention are conducted depends somewhat on the reactants employed, with a broad range of temperature being from about 30° C. to about 150° C. In the case of ethylene being codimerized with propylene and pentene, the temperature range appears to be about 70° C. to about 120° C. with a liquid hour space velocity (LHSV) of about 2 to about 8. For the codimerization of ethylene with butene the preferred temperature range appears to be about 40° C. to about 100° C. with an LHSV ranging from about 6 to about 12. The broad LHSV probably ranges from about 2 to about 20. The term LHSV is the liquid hour space velocity and is defined as the volume of liquid reactants passing through the reactor per hour per volume of catalysts employed, even though in actual practice the reaction is one of vapor phase codimerization.

The pressure of the codimerization of this invention, likewise, has not been found to be too critical and may vary broadly from about 500 to about 2,000 pounds per square inch gauge (p.s.i.g.). Successful experiments have been conducted within a range of from about 750 p.s.i.g. to about 1200 p.s.i.g. with about 1000 p.s.i.g. being near the optimum.

In the practice of this invention it is usually desirable to employ pure olefins as the only reactants, however, diluents may be employed as long as these diluents do not adversely affect the reaction itself nor destroy the activity of the catalysts. Neither should these diluents, for obvious reasons, react themselves or react with either the reactant olefins, or the products resulting from the codimerization. Representative of such inert diluents are paraffinic hydrocarbons such as hexane, pentane, propane and the like, as well as other gases or liquids known to be inert. Aromatic hydrocarbons, examples of which are toluene or xylene, are not desirable as diluents since it is known that under conditions and catalyst employed in the practice of this invention aromatic hydrocarbons may undergo alkylation reaction with either the reactants, or the product codimer. The amount of diluent, if employed, has not been found to be critical and may vary broadly up to a volume ratio of diluent/reactants of 100/1 or more. For economy sake, however, the volume ratio of diluent to olefins should be kept at a volume ratio of about 3 or 4/1, but as was stated above a feed of pure olefins gives best results.

As has been stated before the catalysts employed in this invention are certain alkali metals, i.e. potassium, cesium and rubidium supported on magnesia pellets. The magnesia employed to prepare these pellets usually has a bulk density from about 4 to about 30 pounds per cubic foot. The magnesia or magnesium oxide should have a purity of at least 85% calculated as magnesium oxide. The impurities or the 15% of foreign matter may be any other material which does not adversely affect the magnesia pellets when employed as a support. The magnesia may be prepared in any conventional manner. It may also be prepared in a sense, "in situ"; for instance, the pellets may be prepared from other magnesium compounds such as magnesium carbonate which is heated to a sufficiently high temperature to convert the carbonate into the oxide or at least to convert the magnesium carbonate to at least 85% magnesium oxide.

Additives such as potassium carbonate, potassium halides, i.e. potassium chloride, iodide and bromide, potassium silicate and the like may be mixed with the magnesia prior to the formation of the pellets. These additives have been found to have a moderating influence on the course of the codimerization reaction which is especially noticeable in the early stages of the operation. Generally, this results in a higher selectivity to alpha olefin in the product during the initial period of codimerization when using catalysts prepared from magnesia pellets containing these additives. However, after the initial period the two types of catalysts, i.e. magnesia with additives and magnesia without additives have been found to behave in much the same manner. If one desires to employ additives such as potassium carbonate, potassium halides or potassium silicate, the percentage of additives should vary between about 5 to about 30% with about 5 to 15% by weight being preferred.

The supporting pellets are usually prepared from a thick paste which is prepared with water. This paste is then formed into pellets approximately $\frac{1}{8}''$ x $\frac{1}{8}''$. The size of the pellets it not critical and may be varied to suit any special requirements. After the pellets have been formed they are allowed to air dry until they can be handled without damage and are then further dried in a furnace or by other suitable means at temperatures ranging from about 500° C. to about 1000° C. The pellets of magnesia with or without additives employed to prepare the catalyst of this invention should have a pellet density of between about 0.1 and about 1.0 gram per cubic centimeter. Pellets with a density ranging from 0.25 to 0.75 grams per cubic centimeter are preferred.

To form the actual catalysts of this invention the dried magnesia pellets which may or may not contain additives are contacted with the molten alkali metal at a temperature ranging between the melting point of the alkali metal and about 300° C. If it is not necessary to heat the pellets and the alkali metal to a temperature as high as 300° C. and a temperature around 100° C. should be sufficient. It should be realized that under standard conditions melting point of potassium is 62° C. The melting point of rubidium is 38.5° C. and the melting point of cesium is 28.5° C. Sufficient time of contact between the molten metal and the dried pellets should be allowed to achieve uniform distribution of the metal on the supports. Various methods of reducing this contact time can be employed, such as shaking, stirring or even spraying the molten metal onto the pellets.

The percentages of alkali metal to the magnesia support whether these pellets contain an additive or not should range from about 10% to about 40% by weight of alkali metal based on the weight of the support. A more preferred range is from about 25% to about 40% by weight. It is, of course, to be realized, the actual amount of alkali metal employed as the maximum depends on the pellet density. The lower the pellet density the greater the amount of alkali metal that can be adsorbed on the pellets without "over saturation," i.e. where the catalyst takes on a "metallic shine."

As is stated before, this invention is directed to the codimerization of ethylene with other olefins. By the term "other olefins" is meant any olefin or any unconjugated diolefin such as limonene, dicyclopentadiene and the like may be codimerized with ethylene. The preferred types of "other olefins" may be said to have the following structures:

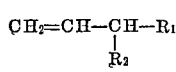

and

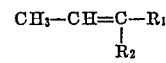

wherein $R_1$ is either hydrogen or an alkyl group with up to about 10 carbon atoms and $R_2$ is either hydrogen or an alkyl group containing about 10 carbon atoms. Representative examples of such olefins are well known and will not be here listed.

The practice of this invention is further illustrated by reference to the following examples which are intended to be representative rather than restrictive of the scope of this invention.

In these examples codimerizations of ethylene with other olefins was carried out in a continuous manner employing the catalyst as a heterogeneous catalyst in a tube reactor. The reactor was 6" long and had an external diameter of 0.5", and a capacity of 10 cubic centimeters. This tube reactor was mounted in a vertical position inside a boiler unit containing the heat exchanger. A 3 foot preheater coil ($\frac{1}{8}''$ tubing) was inserted into the line. The reactor was equipped with the usual thermowells, pressure controls, inlet and outlet valves, etc., as required in normal practice. The feed stock was fed to the reactor by means of pumps and the products of the codimerizations collected in receivers and cooled according to normal practice. The product of these polymerizations was analyzed by conventional gas chromatography techniques. The results are reported in each specific example along with the conditions employed in each example, all percentage figures are reported by weight unless otherwise noted.

The term "conversion" and "selectivity," as employed in this application, are defined as follows: The term "conversion" is the total percent by weight of the olefin "A" and "B" which has undergone reaction. ("A" and "B" are meant to represent the two different olefins which are codimerized.) The term "selectivity" is the percent by weight of specified product based on total product obtained.

EXAMPLE I

Magnesia having a bulk density of about 10 pounds per cubic foot was made into a thick paste using water, which was pressed into pellets approximately $\frac{1}{8}''$ x $\frac{1}{8}''$ and was allowed to dry for a short period of time and then dried in a furnace at 900° C. it was determined that these pellets had a density of about 0.25 gram per cubic centimeter. To these pellets was added 40% by weight of potassium at a temperature slightly above 62° C. which is the melting point of the potassium and sufficient time was allowed for uniform distribution of the material on the magnesia pellets. Several different continuous runs were made where 1-butene was codimerized with ethylene in mol ratios, LHSV's, temperatures, pressures, etc., as set forth in the table below. The products were collected in the conventional manner and analyzed by conventional analytical methods. The results are also set forth in the table below. The conversion is based on the amount of each of the two olefins which are reacted to form the codimer. The products are named and the percent selectivity reported for the individual products formed.

TABLE I.—CODIMERIZATION OF 1-BUTENE WITH ETHYLENE

[Catalyst: 40% K on MgO; Pressure: 1,000 p.s.i.]

| Conditions: | | |
|---|---|---|
| $C_4/C_2$ mol ratio | 1.65 | 1.45 |
| Temperature, ° C | 50 | 52 |
| LHSV | 6 | 6 |
| Conversion percent (Butene) | 26 | 37 |
| Conversion percent (Ethylene) | 45 | 55 |
| Hours of Continuous Operation | 3 | 19 |
| Product Selectivity: | | |
| 3-methyl-1-pentene, percent | 82 | 80 |
| 3-methyl-2-pentene, percent | 6 | 7 |
| n-Hexene, percent | 8 | 9 |
| Higher Polymer, percent | 4 | 4 |

EXAMPLE II

In this example a catalyst was prepared in a manner similar to Example I. Approximately 10% by weight of potassium carbonate was added to the magnesia paste which was then pressed into pellets, dried and impregnated with potasium according to instructions found in Example I. Several different continuous run were made where 2-butene was codimerized with ethylene and the polymerization conditions and products formed are set forth in the table below.

TABLE II.—CODIMERIZATION OF 2-BUTENE WITH ETHYLENE

[Catalyst: 40% K on MgO, $K_2OC_3$ (10%); Pressure: 1,000 p.s.i.]

| Conditions: | | |
|---|---|---|
| $C_4/C_2$ mol ratio | 1.2 | 1.33 |
| Temperature, °C | 90 | 91 |
| LHSV | 8.1 | 8.0 |
| Conversion percent (Butene) | 52 | 35 |
| Conversion percent (Ethylene) | 67 | 47 |
| Hours of Continuous Operation | 3 | 15 |
| Product Selectivity: | | |
| 3-methyl-1-pentene, percent | 84 | 87 |
| 3-methyl-2-pentene, percent | 1 | 2 |
| n-Hexene, percent | 6 | 8 |
| Higher polymer, percent | 9 | 3 |

EXAMPLE III

In this example, propylene was codimerized with ethylene in a manner similar to and employing a catalyst identical to that of Example II. The reaction conditions and results are reported in the table below.

TABLE III.—CODIMERIZATION OF PROPYLENE WITH ETHYLENE

[Catalyst: 40% K on MgO, $K_2CO_3$ (10%); Pressure: 1,000 p.s.i.

| Conditions: | | |
|---|---|---|
| $C_3/C_2$ mol ratio | 1.1 | 1.5 |
| Temperature, °C | 100 | 105 |
| LHSV | 2.4 | 2.2 |
| Conversion percent (Propylene) | 44 | 47 |
| Conversion percent (Ethylene) | 50 | 69 |
| Hours of Continuous Operation | 12 | 42 |
| Product Selectivity: | | |
| 1-pentene, percent | 23 | 26 |
| 2-pentene, percent | 71 | 68 |
| Hexene, percent | 1 | 2 |
| Heptene, percent | 5 | 4 |

EXAMPLE IV

In this example sveeral different runs were made where 2-pentene was reacted with ethylene in a manner outlined in Example II and employing a catalyst identical to that of Example II. The conditions of the reaction and results are given in the table below.

TABLE IV.—CODIMERIZATION OF 2 PENTENE WITH ETHYLENE

[Catalyst: 40% K en MgO, $K_2CO_3$ (10%); Pressure: 1,000 p.s.i.]

| Conditions: | | | |
|---|---|---|---|
| $C_5/C_2$ mol ratio | 1.1 | .9 | .87 |
| Temperature, °C | 80 | 93 | 96 |
| LHSV | 5.1 | 5.2 | 6.1 |
| Conversion percent (Pentene) | 65 | 69 | 67 |
| Conversion percent (Ethylene) | 80 | 66 | 66 |
| Hours of Continuous Operation | 6 | 16 | 20 |
| Product Selectivity: | | | |
| 3 ethyl 1 pentene | 55 | 60 | 65 |
| 3 ethyl 2 petene | 9 | 3 | 2 |
| 4 methyl hexene | 19 | 19 | 16 |
| n Heptene | 11 | 10 | 10 |
| Higher Polymer | 6 | 8 | 7 |

A like example using 1-pentene will give similar results.

As can be seen from the foregoing examples, much higher selectivities can be obtained in the practice of this invention than the mix-dimerization processes of the prior art. Other similar results can be employed following the general procedures of the foregoing examples, using other polymerization conditions of time, temperature, rate, presure and mol ratios of reactants mentioned elsewhere in this specification.

While certain representative embodiments and details have been shown for the purpose of illustrating the invention, it will be apparent to those skilled in this art that various changes and modifications may be made therein without departing from the spirit or scope of the invention.

What is claimed is:

1. A process for the codimerization of ethylene with a dissimilar olefin selected from the group consisting of olefins defined by the formulae

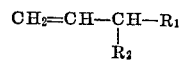

and

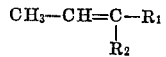

wherein $R_1$ and $R_2$ are selected from the group of hydrogen and an alkyl radical containing from one to about ten carbon atoms which comprises codimerizing ethylene with said olefins by contacting mixtures of ethylene and said olefins with a catalyst comprising at least one alkali metal selected from the group consisting of potassium, cesium and rubidium which is supported on pellets composed of at least 85% magnesia, said pellets having a pellet density between about 0.25 and about 0.75 gram per cubic centimeter and where the pellets having been heated prior to having the alkali metal added to temperatures ranging from about 500° C. to about 1000° C., said catalyst containing about 10% to 50% by weight of said alkali metal.

2. A process according to claim 1 in which said supporting pellets contain about 5% to about 15% of an additive selected from the group consisting of potassium carbonate, potassium silicate and potassium halides.

3. A process according to claim 1 in which the dissimilar olefin is propylene and the codimer which is prepared in a major amount is 2-pentene.

4. A process according to claim 2 in which the dissimilar olefin is propylene and the codimer which is prepared in a major amount is 2-pentene.

5. A process according to claim 1 in which the dissimilar olefin is at least one n-butene from the group of 1-butene and 2-butene and the codimer which is prepared in a major amount of 3-methyl-1-pentene.

6. A process according to claim 2 in which the dissimilar olefin is at least one n-butene from the group of 1-butene and 2-butene and the codimer which is prepared in a major amount is 3-methyl-1-pentene.

7. A process according to claim 1 in which the dissimilar olefin is 2-pentene and the codimer which is prepared in a major amount is 3-ethyl-1-pentene.

8. A process according to claim 2 in which the dissimilar olefin is 2-pentene and the codimer which is prepared in a major amount is 3-ethyl-1-pentene.

References Cited

UNITED STATES PATENTS

| 2,952,719 | 9/1960 | Appell. | |
| 3,216,947 | 11/1965 | Wilkes | 252—192 |
| 3,251,895 | 5/1966 | Wilkes. | |
| 3,305,599 | 2/1967 | Zadra et al. | |

PAUL M. COUGHLAN, Jr., *Primary Examiner.*

U.S. Cl. X.R.

252—443